UNITED STATES PATENT OFFICE.

EDWARD B. MOWER, OF CEDAR RAPIDS, IOWA, ASSIGNOR TO DOUGLAS BROTHERS & MOWER, OF SAME PLACE.

ROLLED RYE.

SPECIFICATION forming part of Letters Patent No. 412,523, dated October 8, 1889.

Application filed March 28, 1889. Serial No. 305,170. (No specimens.)

*To all whom it may concern:*

Be it known that I, EDWARD B. MOWER, a citizen of the United States, residing at Cedar Rapids, Iowa, have invented a certain new and useful Article of Manufacture consisting of Rolled Rye, of which the following is a specification.

The object of my invention is to furnish a product prepared from rye suitable for all uses to which rye may be put as an article of food, and possessing the advantage, among other things, of being easily and quickly cooked or prepared for the table.

To this end my invention consists of a new article of manufacture which, from the fact that it is rolled out into flakes or thin wafers, for the purpose of distinction I shall term "rolled rye."

In preparing my rolled rye I take an ordinary article of rye and subject it to a cleaning process, in order to remove as far as possible all impurities, such as dust, weeds, &c. I then carefully dry the rye, preferably in a kiln. I then subject the rye to a process of decortication, preferably by passing it through a pair of rapidly-revolving sandstones. As the rye is discharged from these stones it is subjected to a wind blast, so as to separate and carry off from the rye as much of the loose fiber and husk as possible. I then prefer to scour the rye by a suitable emery scourer, removing the remaining particles of the hull, and again to subject it to another wind blast to remove the loose hulls resulting from the scourer. After I have thus decorticated the rye and removed the husk I subject it to a steaming process, preferably by bringing a jet of live steam against and in contact with it, so as to soften the rye and prepare it for the rollers to which it is to be subjected. After it has been sufficiently steamed and softened I pass the rye through a set of rapidly-revolving rollers, by which each grain is pressed into a flat flake or wafer. In passing through the rollers most of the moisture is driven out of the rye; but in order to fully dry it I prefer to pass it through a suction-fan, which extracts the moisture and completes the process of manufacturing rolled rye.

As the object which I desire to secure is the manufacture of a flat flake or wafer out of ordinary rye, other means may be employed, if desired; or the means which I have described may be varied for hulling, cleaning, softening, and rolling the rye.

What I regard as new, and desire to secure by Letters Patent, is—

As a new article of manufacture, rolled rye, substantially as set forth.

EDWARD B. MOWER.

Witnesses:
GEO. B. DOUGLAS,
J. H. HAZLETON.